United States Patent [19]
Knauf et al.

[11] 3,993,822
[45] Nov. 23, 1976

[54] MULTI-LAYER PLASTERBOARD

[75] Inventors: Alfons Knauf, Siersburg; Karl Knauf, Iphofen; Franz Wirsching, Iphofen, Mfr.; Gerhard Neuhauser, Mainbernheim; Herbert Altenhöfer, Iphofen, all of Germany

[73] Assignee: Gebr. Knauf Westdeutsche Gipswerke, Iphofen, Germany

[22] Filed: Mar. 16, 1973

[21] Appl. No.: 341,955

Related U.S. Application Data

[63] Continuation of Ser. No. 117,983, Feb. 23, 1971, abandoned.

[52] U.S. Cl. ............................ 428/213; 428/228; 428/251; 428/268; 428/285; 428/299; 428/317; 156/42; 156/71
[51] Int. Cl.² ...................... B32B 7/02; B32B 17/02
[58] Field of Search ............... 161/88, 93, 156, 170, 161/192, 193, 37, 38, 39, 43, 45; 52/596; 428/247, 251, 252, 273, 213, 228, 268, 285, 299, 308, 317; 156/42, 71

[56] References Cited
UNITED STATES PATENTS

| | | |
|---|---|---|
| 2,322,771 | 6/1943 | Palm et al. ...................... 161/93 X |
| 2,806,811 | 9/1957 | Von Hazmburg ............... 161/270 X |
| 2,871,134 | 1/1959 | Loechl .......................... 161/270 X |
| 3,185,297 | 5/1965 | Rutledge ............................. 206/59 |
| 3,350,257 | 10/1967 | Hourigan et al. ..................... 161/43 |

FOREIGN PATENTS OR APPLICATIONS

| | | |
|---|---|---|
| 1,033,123 | 6/1958 | Germany |

*Primary Examiner*—Marion E. McCamish
*Assistant Examiner*—William R. Dixon, Jr.
*Attorney, Agent, or Firm*—Holman & Stern

[57] ABSTRACT

A multi-layered gypsum board for construction purposes in which a mixture of gypsum, water and fibers provide the center or core of the board, and a composite coating of a fiberglass layer and a layer of fiberglass fleece covers one of the major surfaces of the core, with the fiberglass layer being embedded into the mixture and plaster favorably adhering to the outer surface of the fiberglass fleece layer. The other major surface of the core may be covered with a similar coating, or a layer, for example, of pasteboard.

2 Claims, 3 Drawing Figures

MULTI-LAYER PLASTERBOARD

This is a continuation of application Ser. No. 117,983, filed Feb. 23, 1971, now abandoned.

BACKGROUND OF THE INVENTION

The present invention relates to a method for the manufacture of a coated plasterboard as well as the product in which a mixture is produced which consists of gypsum, water and fibers, and this mixture is formed into a sheet and then applied to at least one of the major areas of the plasterboard and the entity is then moved through grooved rollers or bandconveyors.

In a method of the above-mentioned type, (Cf German Pat. No. 1,033,123), a glass fiber fleece, while being applied to the plasterboard, is impregnated with pure gypsum, and the mixture with which the plasterboard is covered is in an expanded foamy condition. This method is relatively difficult to carry out since two different gypsum mixtures of various thicknesses must be securely combined with each other while both are in a wet state, and which will rarely have the desired uniformity. In addition, the pure gypsum will form residues on the metal of the grooved rollers or band-conveyors, which will clog the conveyors.

In addition to the above-mentioned plasterboard covered by a glassfiber fleece, there are also products known as plaster pasteboard sheets, identified by the German Industry Norm (DIN) as 18,180. Plaster pasteboard sheets are manufactured on belt conveyors in a manner so that a watery solution of burned gypsum having certain additives, is continuously formed and hardened between pasteboard sheets and the resulting product is then cut to the desired size. On the band-conveyors for the manufacture of plaster pasteboard sheets, the bottom pasteboard sheet has two edges which overfold and the cavity formed by the bottom sheet and its edges is filled with a plaster mixture and is moved to a forming table. At the same time, an upper pasteboard sheet, which enters on an upper grooved roller, covers the cavity to make a sandwich. The hardening occurs on a setting board, and after cutting to the desired length, the so-formed plaster pasteboard sheet is then dried in a roll-conveyer dryer.

Defects develop when the plaster pasteboard sheets are used as cover plates, according to the system of blind sheathing as disclosed in the German Auslegeschrift No. 1,287,992 and the German Offenlegung No. 1,434,513. Adhesion defects result, especially on the exposed side or surface of the plaster pasteboard, and in unfavorable or construction-site conditions, complete removal of the pasteboard layer of the plaster pasteboad sheet becomes necessary before the finishing material is applied. Furthermore, mold will appear on the exposed side of the plaster pasteboard sheet as a result of the continued effects of humidity, and the mold must be removed.

SUMMARY OF THE INVENTION

The present invention provides a method to overcome these problems in which the coating layer, during its application to the plasterboard, is in a gypsum-free, dry condition, with the mixture forming the center or core of the plasterboard being in a soft, watery, paste-like condition when applied. A fiberglass layer, used as a cover and fleece, is added to the mixture which will form the plasterboard.

The present method can be accomplished on the same band conveyors which are used for the manufacture of the plaster pasteboard sheets. Clogging of the grooved rollers or band-conveyors is avoided in so far as only the plaster-mass can produce clogging which penetrates the glass fiber layer. The plasterboard which is manufactured by the present method is especially suitable to be used as finishing sheets. Since the defects of the prior art covering sheets appear predominantly on the exposed side, the present plasterboard needs only be covered on the exposed side or surface with a fiberglass layer, and can be covered with a pasteboard layer on the opposite side or the side facing the concrete.

In the present invention, not only glass fiber fleece is used as the fiberglass coating. Construction plasterboards which are covered by glass fiber fleece show a relatively low resistance to fracture. The fiberglass layer applied can also be called glass fiber cloth or glass fibers, per se.

Fiberglass layers are common in themselves. A plasterboard which is reinforced with fiberglass layers possesses the advantage of having a higher resistance to fracture, with such resistance depending on the mesh count and on the thickness of the fiberglass threads. The mesh count is expressed by the number of strands per unit of length, as well as the length in meters of one gram of fiber glass (metric number). The higher resistance to fracture of the plasterboards, when the plasterboards are reinforced with fiberglass layers, can be illustrated by some examples. A plasterboard which is covered by a pasteboard and glassfiber fleece shows an ultimate strength between 70 and 95 kilopounds (kp). In comparison, a plasterboard reinforced with pasteboard and one fiberglass layer, having a mesh count of 6/6 per cm, metric number 30 m/g, has a ultimate strength of 110 kilopounds (kp). Still higher ultimate strengths, namely, 120 kilopounds (kp), are obtained with a construction plasterboard which is reinforced with pasteboard on one side and on the other side with a composite of glass fiber fleece and a fiberglass layer having a mesh count of 2/2 and a metric number of 15 mg. The ultimate strengths were determined in accordance with Norm (DIN) 18,180 for the fleece and/or fiberglass layer which Norm applies to plasterboard sheets. A plasterboard sheet having at one side or surface, namely, the upper side, a layer of fiberglass, while being reinforced on the underside with pasteboard, fulfills the requirements which a finishing plasterboard must meet.

In the manufacture of the inventive plasterboard, a fiberglass layer is used which is covered by a preferably removable pasteboard, a removable plastic foil or removable waterproofed paper. This covering prevents the penetration of plaster during the manufacturing process.

Of special advantage during the manufacture is a combination of a fiberglass cloth or layer and a glass fiber fleece, since the fleece, at the same time, prevents the penetration of gypsum. The layer can be combined with the fleece by means of an adhesive. The fleece, layer composite is added to the gypsum which forms the sheet in such a way that the layer is embedded in the gypsum.

BRIEF DESCRIPTION OF THE DRAWINGS

The instant invention will be better understood by the attached drawings, in which.

DETAILED DESCRIPTION OF THE PREFERRED EMBODIMENT

Figure 1:
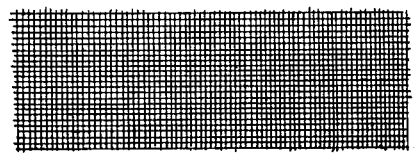
FIG. 1 shows a section of a fiberglass cloth.

A fiberglass cloth or layer has basically the structure as shown in FIG. 1 with a mesh count preferably between 0.5 cm and about 10 cm, and is for the manufacture of plasterboards to be used in construction. It is unimportant whether the mesh count is the same or different lengthwise or crosswise, that is, whether the areas circumscribed by the fiberglass threads are quadrangles with either equal or unequal sides.

Figure 2:
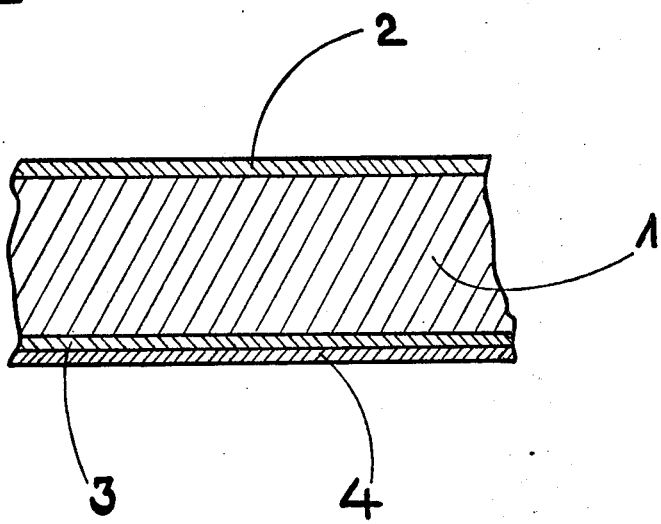
FIG. 2 shows a cross-section through the inventive plasterboard.

A plasterboard sheet which is covered with fiberglass in accordance with FIG. 2 has a center or core 1, which consists of a soft, watery, paste-like mixture of gypsum, water and fibers which has been hardened. Tightly adhered to one major surface of the center 1 is a layer 2 which could consist of a glass fiber fleece, a fiberglass layer, or preferably of pasteboard.

A fiberglass layer or cloth 3 is tightly adhered to the opposite major surface of the center 1. The fiberglass layer 3 is reinforced by a layer 4 which can consist of a glass fiber fleece, a pasteboard, a foil, or treated paper. The layer 4 may thereby be removably attached and is attached to the layer 3 prior to attaching the composite layer 3 to the center 1. According to FIG. 3, the above-mentioned mixture proceeds from a mixer 12 to a forming table 14. A roller 7, which is arranged above and adjacent to the forward end of a band-conveyor 15, forms the mixture into a sheet 9. A fiberglass layer strip 10 is unrolled from a roll and is introduced to the forward end of the band-conveyor 15, after passing over the forming table 14, the mixture of gypsum, water and fibers is deposited on the strip 10. An additional fiberglass layer strip 11 is unrolled from a roll, then guided around the roller 7, and is deposited on the upper surface of the sheet 9.

Figure 3:
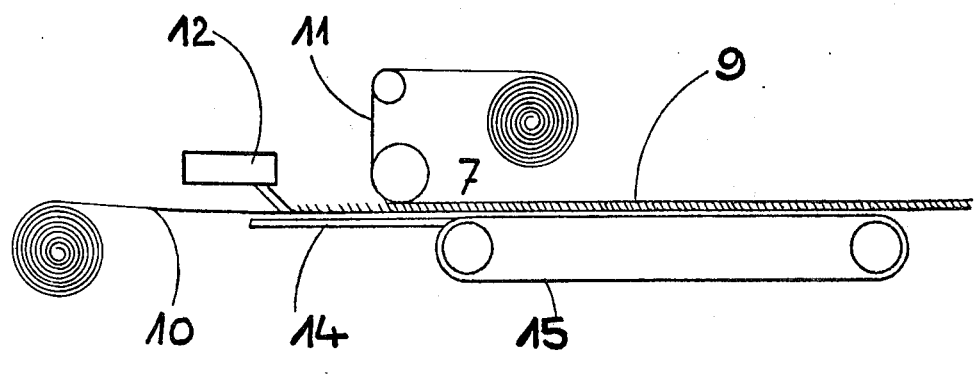
FIG. 3 shows a schematic view of an apparatus for making the inventive plasterboard.

The surface of both fiberglass layer strips 10 and 11 are provided by means of an adhesive, with a paper-layer (not shown), which is attached to the side opposite the sheet 9. This prevents the clogging of the band-conveyor by gypsum which may penetrate through the fiberglass layer 10, and enables, at the same time, a drying of the sheets at a higher temperature so that the capacity of a dryer (not shown), which is located adjacent to the apparatus according to FIG. 3, is used more effectively.

The paperlayer also improves the stability of the still soft sheet. The paperlayer appropriately consists of a nonabsorbable material, as for example, a silicone paper.

What we claim is:

1. A multi-layered gypsum board for construction purposes including a plate-like core of a soft, watery paste-like mixture of gypsum, water and fibers, the core having opposite major surfaces, one major surface being covered with a layer for preventing the penetration of plaster and the other major surface being covered with two layers, one layer being a cloth and the other layer being a material which is denser than the cloth of the one layer for preventing the penetration of gypsum, said two layers being adhesively bonded to each other for providing a composite deposited in a gypsum-free dry condition on the core, one of the two layers being embedded in the core and the other layer being free of gypsum, the thickness of the combined two layers being smaller than the thickness of the core and the core after being covered on the major surfaces with the layers being allowed to harden, the improvement being that the cloth layer is embedded in the core and is fiberglass while the material of the other layer which is denser than the cloth layer is a glassfiber fleece preventing the penetration of gypsum and on the outer surface of which plaster will favorably adhere.

2. The multi-layered gypsum board as claimed in claim 1 in which said fiberglass cloth has a mesh density of 0.5/cm to about 10/cm.

* * * * *

UNITED STATES PATENT OFFICE
CERTIFICATE OF CORRECTION

Patent No. 3,993,822     Dated November 23, 1976

Inventor(s) ALFONS KNAUF, KARL KNAUF, FRANZ WIRSCHING, GERHARD NEUHAUSER, and HERBERT ALTEIHOFER.

It is certified that error appears in the above-identified patent and that said Letters Patent are hereby corrected as shown below:

After Item [63] Related U.S. Application Data insert: -- [30] Foreign Application Priority Data Feb. 25, 1970    Germany......... 2008744
    Oct. 9, 1970    Germany......... 2049603

Signed and Sealed this

Twenty-second Day of February 1977

[SEAL]

Attest:

RUTH C. MASON
*Attesting Officer*

C. MARSHALL DANN
*Commissioner of Patents and Trademarks*